(12) United States Patent
Mlinaric et al.

(10) Patent No.: US 9,726,320 B2
(45) Date of Patent: Aug. 8, 2017

(54) DEVICE FOR ELASTIC SUSPENSION OF AN ASSEMBLY OF RESERVOIRS ON THE UNDERBODY OF A MOTOR VEHICLE

(71) Applicant: TECHNOBOOST, Paris (FR)

(72) Inventors: Arnaud Mlinaric, Livilliers (FR); Laurent Gagliardini, Chatillon (FR); Arnaud Le Dren, Brunoy (FR)

(73) Assignee: Technoboost, Paris (FR)

( * ) Notice: Subject to any disclaimer, the term of this patent is extended or adjusted under 35 U.S.C. 154(b) by 0 days.

(21) Appl. No.: 15/126,250

(22) PCT Filed: Mar. 26, 2015

(86) PCT No.: PCT/FR2015/050782
§ 371 (c)(1),
(2) Date: Sep. 14, 2016

(87) PCT Pub. No.: WO2015/162349
PCT Pub. Date: Oct. 29, 2015

(65) Prior Publication Data
US 2017/0082240 A1  Mar. 23, 2017

(30) Foreign Application Priority Data
Apr. 25, 2014 (FR) ..................... 14 53740

(51) Int. Cl.
*B60P 3/22* (2006.01)
*F16M 13/02* (2006.01)
(Continued)

(52) U.S. Cl.
CPC ........... *F16M 13/02* (2013.01); *B60K 15/067* (2013.01); *B60K 15/07* (2013.01); *B60R 11/00* (2013.01);
(Continued)

(58) Field of Classification Search
CPC ...... F16M 13/02; B60R 11/00; B60K 15/067; F16F 15/08; F16C 13/084
(Continued)

(56) References Cited

U.S. PATENT DOCUMENTS 5,370,418 A * 12/1994 Pugh ................ B60K 15/03006
180/311
5,997,040 A * 12/1999 Fukagawa ............ B60K 15/013
180/69.5
(Continued)

FOREIGN PATENT DOCUMENTS

DE         19528557 A1   6/1997
DE     202006019006 U1   2/2007
(Continued)

OTHER PUBLICATIONS

International Search Report of corresponding application PCT/FR2015/50782 mailed Jun. 18, 2015.
(Continued)

*Primary Examiner* — Todd M Epps
(74) *Attorney, Agent, or Firm* — Polster, Lieder, Woodruff & Lucchesi, LC

(57) ABSTRACT

The invention relates to a device for elastic suspension of an assembly of reservoirs (50, 60) on the underbody of a motor vehicle. The reservoirs (50, 60) are mounted substantially in parallel and have a substantially cylindrical general shape terminated by two shaped end pieces (50A, 50B; 60A, 60B). Said novel suspension device comprises two flanges (10, 11), which fit closely to the shaped end pieces (50A, 50B; 60A, 60B) of the reservoirs (50, 60) and are linked together by tie rods (30) gripping said reservoirs (50, 60), and a plurality of arms (40A, 40B, 40C, 40D) which link the flanges (10, 11) to a plurality of elastic connection points of the suspension device on the vehicle body.

11 Claims, 1 Drawing Sheet

(51) Int. Cl.
  *B60K 15/07*   (2006.01)
  *F17C 13/08*   (2006.01)
  *B60K 15/067*  (2006.01)
  *B60R 11/00*   (2006.01)
  *F16F 15/08*   (2006.01)
  *B60K 15/063*  (2006.01)

(52) U.S. Cl.
  CPC ............ *F16F 15/08* (2013.01); *F17C 13/084* (2013.01); *B60K 2015/0634* (2013.01); *B60K 2015/0675* (2013.01); *B60R 2011/004* (2013.01); *B60R 2011/0049* (2013.01); *F16F 2230/0005* (2013.01); *F17C 13/08* (2013.01); *F17C 2201/0109* (2013.01); *F17C 2201/056* (2013.01); *F17C 2201/058* (2013.01); *F17C 2205/013* (2013.01); *F17C 2205/0107* (2013.01); *F17C 2205/0188* (2013.01); *F17C 2205/0196* (2013.01); *F17C 2221/012* (2013.01); *F17C 2221/035* (2013.01); *F17C 2223/0123* (2013.01); *F17C 2223/0153* (2013.01); *F17C 2270/0168* (2013.01); *Y02E 60/321* (2013.01)

(58) Field of Classification Search
  USPC ......... 248/610; 280/830, 834; 180/311, 314, 180/69.5
  See application file for complete search history.

(56) References Cited

U.S. PATENT DOCUMENTS

| 6,672,620 | B2 * | 1/2004 | Kawazu | B60K 15/07 280/834 |
| 7,137,474 | B2 * | 11/2006 | Yokote | F17C 13/084 180/314 |
| 2003/0189334 | A1 * | 10/2003 | Kawasaki | B62D 21/155 280/834 |
| 2012/0161430 | A1 * | 6/2012 | Mulanon | F17C 13/084 280/834 |

FOREIGN PATENT DOCUMENTS

| DE | 202013004145 U1 | 6/2013 |
| FR | 2972682 A1 | 9/2012 |
| JP | 2009255759 A | 11/2009 |
| WO | 0024608 A1 | 5/2000 |
| WO | 2005088137 A1 | 9/2005 |
| WO | 2006057765 A2 | 6/2006 |

OTHER PUBLICATIONS

Written Opinion of corresponding application PCT/FR2015/50782 mailed Jun. 18, 2015.

* cited by examiner

DEVICE FOR ELASTIC SUSPENSION OF AN ASSEMBLY OF RESERVOIRS ON THE UNDERBODY OF A MOTOR VEHICLE

CROSS-REFERENCE TO RELATED APPLICATIONS

This application is the US National Stage of International Application PCT/FR2015/050782 which was filed Mar. 26, 2015, and published as WO2015/162349, which derives priority from French application No. 1453740filed Apr. 25, 2014 and which are hereby incorporated by reference.

BACKGROUND

The invention relates to an elastic suspension device for a set of reservoirs on the underbody of a motor vehicle. The invention also relates to a motor vehicle wherein at least two reservoirs are suspended from the underbody of the vehicle by means of such an elastic suspension device.

It is understood in the remainder of this text that "reservoirs" refers to many types of reservoirs or accumulators such as, for example, fuel tanks, hydrogen containers, LPG ("liquid petroleum gas") tanks, CNG ("compressed natural gas for a vehicle") tanks, or hydropneumatic accumulators which enable the storage of energy through the use of liquids or gases under pressure.

Many systems for mounting a reservoir or an accumulator, or an assembly of reservoirs or accumulators, on the underbody of a motor vehicle are known from the prior art. By way of examples, the tubular frame may be mentioned, as can clamps with yokes or fastening systems using an overmolding technique.

Also known, according to FR 2 972 682, is a hydraulic drivetrain system for a motor vehicle, comprising a motor driving a hydraulic pump for recharging the pressure accumulators, and at least one hydraulic traction motor driving the driving wheels of the vehicle, which is controlled by a hydraulic manifold block connected to the pressure accumulators. This drivetrain system comprises a sub-assembly including a high-pressure accumulator arranged under the vehicle underbody, in the longitudinal axis of the vehicle, and a low-pressure accumulator rigidly attached to the end of the high-pressure accumulator, and arranged transversely to the high-pressure accumulator. The pressure accumulators, the HP hydraulic manifold blocks and the hydraulic traction motors are connected directly together to form a rigid sub-assembly comprising the general shape of a "T".

Also known, according to WO 2005/088137, is a hydraulic service module in a hydraulic fluid system having a fluid reservoir for storing an appropriate amount of a hydraulic fluid. This hydraulic service module comprises an outer casing in an enclosure defining an air chamber formed in the enclosure, the air chamber being in fluid communication with ambient air. This hydraulic service module also comprises at least one fluid pressure accumulator mounted within the enclosure, and a heat exchanger provided for cooling the hydraulic fluid, the exchanger being disposed within the air chamber.

In general, known systems for suspension or mounting of reservoirs or accumulators on the underbody of a motor vehicle have various disadvantages, including those resulting from their bulk which is not optimized. For hydropneumatic accumulators, there are added the defects which result from an excessive flexibility of the suspension system with regard to noise and vibration requirements (insufficient filtration excitations from flow and pressure pulsations in the hydraulic circuit).

SUMMARY

Briefly, an elastic suspension device is provided for suspending an assembly of underbody reservoirs from a motor vehicle, that will overcome the disadvantages of suspension devices known in the prior art and some of which are mentioned above, thus providing an elastic suspension device of an assembly of underbody reservoirs of a vehicle that is of optimized mass, compactness and vibrational behavior.

Another object is to provide such an elastic suspension device of an assembly of underbody reservoirs of a motor vehicle that is of a design, manufacture and simple assembly which is effective, robust, reliable and economic.

To achieve these objects, an elastic suspension device for an assembly of underbody reservoirs of a motor vehicle is provided in which the reservoirs are arranged substantially parallel to each other and are substantially of a generally cylinder shape terminated longitudinally by two end pieces. This suspension device, again, includes on the one hand, two flanges which embrace the end pieces of the reservoirs and are connected together by tie rods enclosing the reservoirs and, on the other hand, a plurality of arms which connect the flanges with a plurality of elastic connection points on the vehicle body.

According to a preferred embodiment of the invention, the plurality of arms is composed of four arms embedded or fixed by two in one and two in the other of the two flanges, and the plurality of elastic connection points on the vehicle body is composed of four elastic connection points.

The end pieces of the reservoirs can be substantially ogivale-shaped pieces, the flanges then comprising substantially ogivale-shaped holding parts, in which the end pieces of the reservoirs are inserted in an substantially ogivale-shaped manner.

According to one nonlimiting embodiment of the suspension device, there are two reservoirs.

The arms are preferentially embedded or fixed in the substantially ogivale-shaped holding part of the flanges.

Also preferably, the tie rods may be six in number and comprised of cylindrical rods threaded at the ends to allow each tie rod to connect firmly to the two flanges.

An elastomeric portion may be advantageously located between the flanges and reservoirs, and the elastic connection points of the suspension device on the vehicle body may be of elastomeric pads substantially oriented vertically.

The suspension device according to the present invention may be made of one of the following materials: steel, aluminum, composite material, and plastic material.

The present invention also relates to a motor vehicle, which comprises a set of reservoirs suspended on the underbody, which assembly of reservoirs is suspended via a resilient suspension device as broadly described above.

DESCRIPTION OF THE DRAWINGS

Other objects, advantages and features of the invention appear from the following description of an exemplary embodiment, nonlimiting with reference to the object and scope of the present patent application, accompanied by drawings in which.

DETAILED DESCRIPTION

Figure 1:
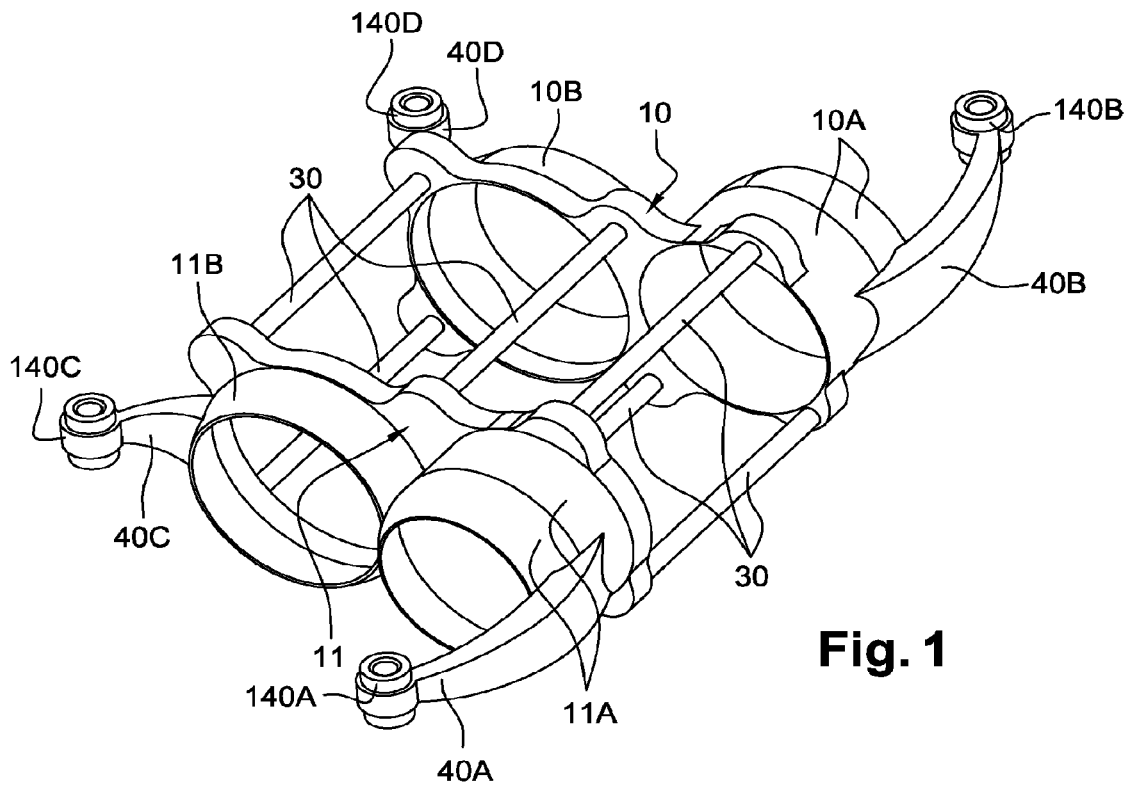
FIG. 1 is a perspective, schematic view of an embodiment of the elastic suspension device of an assembly of underbody reservoirs of a motor vehicle.
Figure 2:
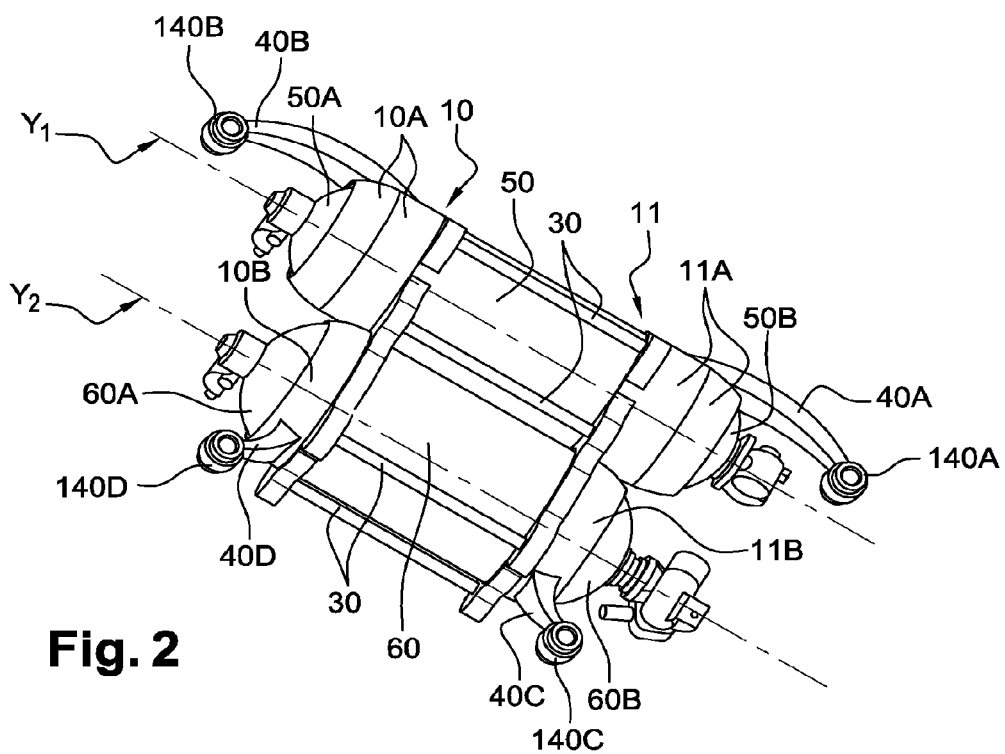
FIG. 2 is a perspective view, also schematic, of the FIG. 1 suspension device mounted with two accumulators.

Referring to the drawing of FIG. 1, there is depicted an exemplary embodiment of an elastic suspension of an assembly of two underbody reservoirs of a motor vehicle. The two reservoirs, depicted in the drawing of FIG. 2 and designated by references 50 and 60, are substantially of a generally cylindrical shape terminated with a substantially ogivale shaped end pieces 50A, 50B, 60A, 60B, respectively, at each of the two ends. The longitudinal axes $Y_1$ and $Y_2$ of the two reservoirs 50, 60 respectively, are substantially parallel.

The suspension device according to the invention consists on the one hand, of two flanges, labeled 10 and 11, which are interconnected by six tie rods designated collectively by the reference numeral 30 and designed to grip the reservoirs 50 and 60, and on the other hand, four arms 40A, 40B, 40C and 40D that connect the flanges 10 and 11 at four elastic connection points on the frame of the vehicle bodywork.

The end pieces 50A, 50B, 60A, 60B of the reservoirs 50, 60 being substantially ogivale shaped, the flanges 10, 11 therefore comprise substantially ogivale or "egg carton" shaped holding parts, in which are inserted these ogivale shaped end pieces. Thus, the reservoir 50 is held by the holding parts 10A and 11A of the flanges 10 and 11, respectively, while the reservoir 60 is held by the holding parts 10B and 11B of the flanges 10 and 11, respectively.

As illustrated in the figures, the arms 40A, 40B, 40C, 40D, which achieve the connection points on the vehicle bodywork, are embedded or fixed in the holding parts, respectively 11A, 10A, 11B, 10B, substantially ogivale shaped flanges 10, 11, so as to give them a significant embedded rigidity in all directions. The support surfaces are coated with a thin elastomeric layer so as to distribute the stress on the contact surface.

The suspension arms 40A, 40B, 40C, 40D, depending on the constituent material, may be welded on the flanges 10, 11 or well achieved by welding with the latter.

The tie rods 30 are comprised of cylindrical rods threaded at their ends, in order to allow each tie rod 30 to rigidly connect the two flanges 10 and 11. The longitudinal axes of the tie rods 30 are substantially parallel to the longitudinal direction of the reservoirs, namely $Y_1$ and $Y_2$.

An elastomeric part (not shown in the drawings) may be located advantageously between the flanges 10, 11 and reservoirs 50, 60.

Note that the ends of the reservoirs may be of any shape, because the elastomeric part mentioned above, disposed between the flanges 10, 11 and reservoirs 50, 60, can conform to very different shapes.

The four elastic connection points 140A, 140B, 140C and 140D of the suspension device on the vehicle body, which are located at the ends of arms 40A, 40B, 40C and 40D, are elastic shims or elastomeric pads oriented substantially vertically. The vertical position and orientation of the elastomeric pads is held in place by the constraints of local rigidity and synthesis of the vehicle (crash tests, ease of installation or assembly, in particular). These constraints force the separation of the connection points of the suspended reservoirs.

The suspension device described above may be made of steel, or aluminum, or made of a composite material, or alternatively of a plastic material.

It is to be noted that the suspension arms 40A, 40B, 40C, 40D have a sufficient width in the direction "Z" of the vehicle, so as to overcome the problems of bending the assembly of the vehicle body and reservoirs due to the fact that the elastic connection points on the vehicle body are relatively remote from reservoirs.

It is also to be noted that the tie rods 30, because their ends are threaded, allow controlling the clamping force of the holding parts on the ends of reservoirs 50, 60.

The operation of the suspension device described above in an exemplary embodiment is as follows:
 the positioning the two reservoirs 50, 60,
  the placing of the holding parts 10A, 10B, 11A, 11B of an ogivale-shape or "egg carton"-shape with an integrated elastomer, and
  the mounting of the assembly under the vehicle body.

The transverse forces are taken up by "total insertion" of the ends of the reservoirs 50, 60 at the level of the ogivale or "egg carton" shaped holding parts 10A, 10B, 11A, 11B, and the reservoirs themselves contribute to the rigidity.

It goes without saying that the suspension device described above is provided by way of a non-limiting example of the object and scope of the present invention. The suspension arm system may be redesigned according to the further connection points and attaching points on the framework of the vehicle. Alternatively, the threaded tie rods 30 may also be replaced by cables.

The elastic suspension device of an assembly of underbody reservoirs of a motor vehicle described above in an exemplary embodiment, has many advantages, including the following advantages:
 it provides an optimally rendered mass,
 it is comparatively more compact than suspension devices of reservoirs known from the prior art, and
 it offers a better vibration behavior (high specific rigidity).

The invention claimed is:

1. An elastic suspension device for suspending an assembly of reservoirs to an underbody of a vehicle body of a motor vehicle, said reservoirs being substantially parallel to each other and having a substantially cylinder shape terminated longitudinally by two end pieces, wherein said suspension device comprises two flanges which embrace said end pieces of the reservoirs and which are interconnected by connecting members surrounding said reservoirs, and a plurality of arms connecting the flanges to a plurality of elastic connection points on the vehicle body.

2. The suspension device according to claim 1, wherein said plurality of arms comprises four arms, with two of said arms being fixed to one of the flanges and the other two of the arms being fixed to the other of the two flanges, and in that said plurality of elastic connection points on the vehicle body comprises of up to four elastic connection points.

3. The suspension device according to claim 1, wherein said end pieces of the reservoirs are substantially ogivale shaped pieces, the flanges therefore comprising holding parts, which are substantially ogivale shaped, and in which are inserted said end pieces of the reservoirs substantially in a ogivale shaped manner.

4. The suspension device according to claim 3 wherein the arms are fixed to the holding parts of the substantially ogivale shaped flanges.

5. The suspension device according to claim 1, wherein said assembly of reservoirs comprises two reservoirs.

6. The suspension device according to claim 5 including six connecting members comprised of cylindrical bars threaded at the ends thereof to allow each connecting member to rigidly connect two flanges.

7. The suspension device according to claim 1, wherein an elastomeric part is located between the flanges and the reservoirs.

8. The suspension device according to claim 1, wherein the elastic connection points of the suspension device on the vehicle body are elastomeric pads oriented substantially vertically.

9. The suspension device according to claim 1, wherein said suspension device is made from a material selected from a group consisting of steel, aluminum, composite material, and plastic material.

10. A motor vehicle comprising an assembly of reservoirs suspended from said vehicle underbody, wherein said assembly of reservoirs is suspended via an elastic suspension device according to claim 1.

11. The suspension device according to claim 1, wherein the connecting members are tie rods.

* * * * *